United States Patent
Hikita

(10) Patent No.: US 9,352,620 B2
(45) Date of Patent: May 31, 2016

(54) MOTORCYCLE TIRE FOR RUNNING ON ROUGH TERRAIN

(75) Inventor: Masahiro Hikita, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1059 days.

(21) Appl. No.: 13/466,281

(22) Filed: May 8, 2012

(65) Prior Publication Data

US 2012/0305154 A1  Dec. 6, 2012

(30) Foreign Application Priority Data

May 30, 2011  (JP) .................................. 2011-120745

(51) Int. Cl.
  *B60C 11/11*  (2006.01)

(52) U.S. Cl.
  CPC ............. *B60C 11/11* (2013.01); *B60C 2200/10* (2013.04); *B60C 2200/14* (2013.04)

(58) Field of Classification Search
  CPC .......................... B60C 11/11; B60C 11/1369
  USPC .................................................. D12/536, 571
  See application file for complete search history.

(56) References Cited

U.S. PATENT DOCUMENTS

| 4,311,179 | A | * | 1/1982 | Hayakawa | B60C 11/11 |
| | | | | | 152/209.11 |
| D577,653 | S | * | 9/2008 | Sueishi | D12/512 |
| D584,678 | S | * | 1/2009 | Sueishi | D12/536 |
| D595,637 | S | * | 7/2009 | Sueishi | D12/536 |
| D596,107 | S | * | 7/2009 | Sueishi | D12/512 |
| D637,140 | S | * | 5/2011 | Hikita | D12/536 |
| D640,965 | S | * | 7/2011 | Hikita | D12/536 |

FOREIGN PATENT DOCUMENTS

| JP | 58-164406 A | * | 9/1983 |
| JP | 60-199705 A | * | 10/1985 |
| JP | 2007-131111 A | | 5/2007 |

* cited by examiner

*Primary Examiner* — Steven D Maki
(74) *Attorney, Agent, or Firm* — Birch, Stewart, Kolasch & Birch, LLP

(57) ABSTRACT

A motorcycle tire for running on rough terrain has a block pattern that includes major groups arranged circumferentially of the tire at intervals, and minor groups arranged between the major groups. The major group consists of four blocks arranged axially of the tire and each connected to the next with a tie bar, wherein each is defined as having the centroid of its top surface within a tread center region having a developed width of 60% of a developed tread width, and angles ($\theta 1a$) of straight lines drawn between axially adjacent centroids are not more than 10 degrees with respect to the tire axial direction. The minor group consists of two or three blocks connected with a tie bar, and angles of straight lines drawn between axially adjacent centroids of top surfaces of the blocks are 15 to 80 degrees with respect to the tire axial direction.

15 Claims, 5 Drawing Sheets

MOTORCYCLE TIRE FOR RUNNING ON ROUGH TERRAIN

BACKGROUND OF THE INVENTION

The present invention relates to a pneumatic tire, more particularly to a tread pattern of a motorcycle tire for running on rough terrain capable of improving the contact with the ground, braking performance and cornering performance.

In general, a motorcycle tire for running on rough terrain for example used in a motocross race is provided in the tread portion with a block pattern formed by a number of independent blocks so that the blocks dig into soft grounds such as sand and mud and increase the road grip to improve the cornering performance, braking performance and the like.

The cornering performance may be improved by increasing the effectual circumferential component of the edges of blocks existing in the ground contacting patch of the tire. The effectual circumferential component can be increased by circumferentially shifting the blocks from one another. But, such circumferential shifting can not increase the effectual axial component of the block edges. Instead, there is a possible of reducing the effectual axial component existing in the ground contacting patch.

The braking performance may be improved by adopting a block whose axial dimension is increased to increase the axial component of the block edges. In this case, if the circumferential dimension is also increased to increase the circumferential component of the block edges, then as the block size increase, the block becomes difficult to dig into soft grounds. Therefore, the circumferential dimension is not to be increased.

Thus, it is difficult to effectively improve the cornering performance and the braking performance at the same time.

SUMMARY OF THE INVENTION

It is therefore, an object of the present invention to provide a motorcycle tire for running on rough terrain in which the cornering performance and the braking performance can be improved at the same time.

According to the present invention, a motorcycle tire for running on rough terrain comprises a tread portion provided with a block pattern defined by blocks, the blocks including major groups arranged circumferentially of the tire at intervals and minor groups disposed between the major groups, each of the major groups consisting of four of the blocks arranged axially of the tire and each connected to the next with a tie bar having a radial height lower than those of the blocks, wherein the four blocks are each defined as having the centroid of its top surface within a center region of the tread portion defined as being centered on the tire equator and having a developed width of 60% of a developed tread width, and angles ($\theta 1a$) of straight lines drawn between the axially adjacent centroids are not more than 10 degrees with respect to the tire axial direction, and each of the minor groups consisting of two or three of the blocks connected with each other with a tie bar having a radial height lower than those of the blocks, and angles of straight lines drawn between axially adjacent centroids of the top surfaces of the blocks of the minor groups are 15 to 80 degrees with respect to the tire axial direction.

Therefore, when running on soft grounds, in addition to the four blocks of the major group, the three tie bars therebetween also reach to the ground, and the edges of the three tie bars and the four blocks function to improve the road grip. Especially, by the increased axial component of the edges, the braking performance can be effectively improved. Further, the edges of the four blocks are not decreased by the tie bars, therefore, the circumferential component thereof fully functions to improve the cornering performance.

Meanwhile, in the minor group, the axially adjacent blocks are circumferentially shifted from each other, therefore, the circumferential component of the edges of such blocks is increased and thereby the cornering performance can be improved. As the major groups and minor groups are alternately arranged, both of the braking performance and cornering performance can be improved well balancedly.

Further, the blocks are connected with the tie bars and thereby increased in the stiffness, therefore, the improvement in the braking performance, cornering performance and the like can be furthered.

The motorcycle tire according to the present invention may be further provided with the following optional features:

the minor groups include minor central groups whose blocks each having the centroid of its top surface within the center region of the tread portion, and minor shoulder groups whose blocks each having the centroid of its top surface within a shoulder region of the tread portion outside the center region;

the minor central group consists of two of the blocks whose centroids are disposed on each side of the tire equator and shifted from each other in the tire circumferential direction;

the two blocks of the minor central group are an inside center block of which centroid is positioned at an axial distance L3$a$ from the tire equator, and an outside center block of which centroid is positioned at an axial distance L3$b$ from the tire equator which is more than the axial distance L3$a$;

the minor shoulder groups include double-block minor shoulder groups, each consisting of two of the blocks, and arranged staggeredly on both sides of the tire equator, and triple-block minor shoulder groups, each consisting of three of the blocks, and arranged staggeredly on both sides of the tire equator;

an angle ($\theta 1c$) of a straight line drawn between the centroids of the two blocks of the double-block minor shoulder group is 30 to 50 degrees with respect to the tire axial direction, and the two blocks of the double-block minor shoulder group are a shoulder block disposed at the tread edge and a middle block disposed axially inside the shoulder block;

an angle ($\theta 1d$) of a straight line drawn between the centroid of the middle block and the axially adjacent centroid of the outside center block of one of the minor central groups is 25 to 45 degrees with respect to the tire axial direction;

the three blocks of the triple-block minor shoulder group are tow shoulder blocks disposed at the tread edge and one middle block disposed at a position axially inside the tow shoulder blocks and circumferentially between the tow shoulder blocks, and angles ($\theta 1e$) of straight lines drawn between the centroid of the middle block and the two centroids of the two shoulder blocks are 30 to 50 degrees with respect to the tire axial direction;

an angle ($\theta 1f$) of a straight line drawn between the centroid of the middle block of the triple-block minor shoulder group and the axially adjacent centroid of the inside center block of one of the minor central groups is not more than 10 degrees with respect to the tire axial direction;

the top surfaces of the blocks are each provided with an independent indentation; and the major groups are staggered with respect to the tire equator so that the axial shift between the groups shifted rightward and the groups shifted leftward is 1 to 8% of the developed tread width.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. If no standard is available, a wheel rim recommended by the tire manufacturer and a maximum air pressure specified by the tire manufacturer are used.

The developed tread width TWe means a distance measured perpendicularly to the tire equator from one of the tread edges 2t to the other along the tread surface.

DESCRIPTION OF THE PREFERRED EMBODIMENTS

Embodiments of the present invention will now be described in detail in conjunction with accompanying drawings.

Figure 1:
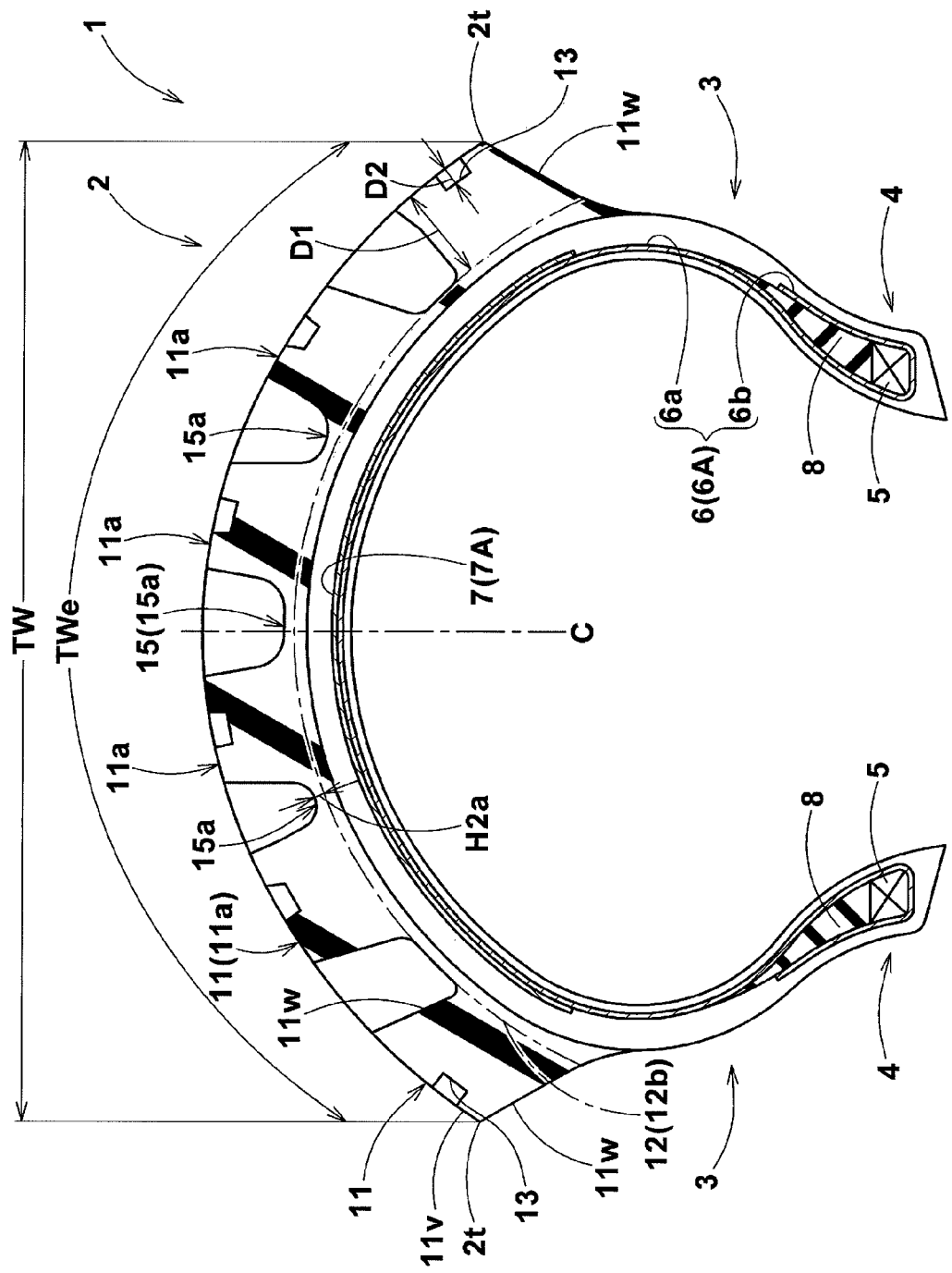
FIG. 1 is a cross sectional view of a motorcycle tire for running on rough terrain according to the present invention under the normally inflated unloaded state of the tire, taken along line A-A of FIG. 2.

According to the present invention, as shown in FIG. 1, a motorcycle tire 1 comprises a tread portion 2, a pair of sidewall portions 3, a pair of bead portions 4 each with a bead core 5 therein, a carcass 6 extending between the bead portions 4 through the tread portion 2 and sidewall portions 3, and a tread reinforcing layer 7 disposed radially outside the carcass 6 in the tread portion 2.

As a characteristic of a motorcycle tire, the tread portion 2 is convexly curved so that the tread face between the tread edges 2t is curved like an arc swelling radially outwardly, and the maximum cross sectional width of the tire 1 occurs between the tread edges 2t, namely, equals to the axial tread width TW.

In this embodiment, the motorcycle tire 1 is designed to exert its excellent performance when running on soft grounds such as sand and mud and thus it is suitable for used in a motocross race.

The carcass 6 is composed of at least one carcass ply 6A, in this embodiment only one carcass ply 6A, extending between the bead portions 4 through the tread portion 2 and sidewall portions 3, and turned up around the bead core 5 in each of the bead portions 4 so as to form a pair of turned up portions 6b and a main portion 6a therebetween. For the carcass cords, organic fiber cords such as nylon, polyester, rayon and the like can be used.

In the case of the solo carcass ply 6A as in this embodiment, a radial ply made of organic fiber cords arranged at an angle of from 75 to 90 degrees with respect to the tire circumferential direction can be used.

However, it is also possible to use a bias ply carcass composed of two or more carcass plies each made of carcass cords arranged at an angle of from 15 to 45 degrees with respect to the tire circumferential direction.

In each of the bead portions 4, between the carcass ply main portion 6a and turned up portion 6b, there is disposed a bead apex 8 made of hard rubber extending radially outwardly in a tapered manner from the bead core.

The tread reinforcing layer 7 is composed of at least one ply, in this embodiment only one ply 7A, of organic fiber cords laid at an angle of 15 to 45 degrees with respect to the tire circumferential direction.

Figure 2:
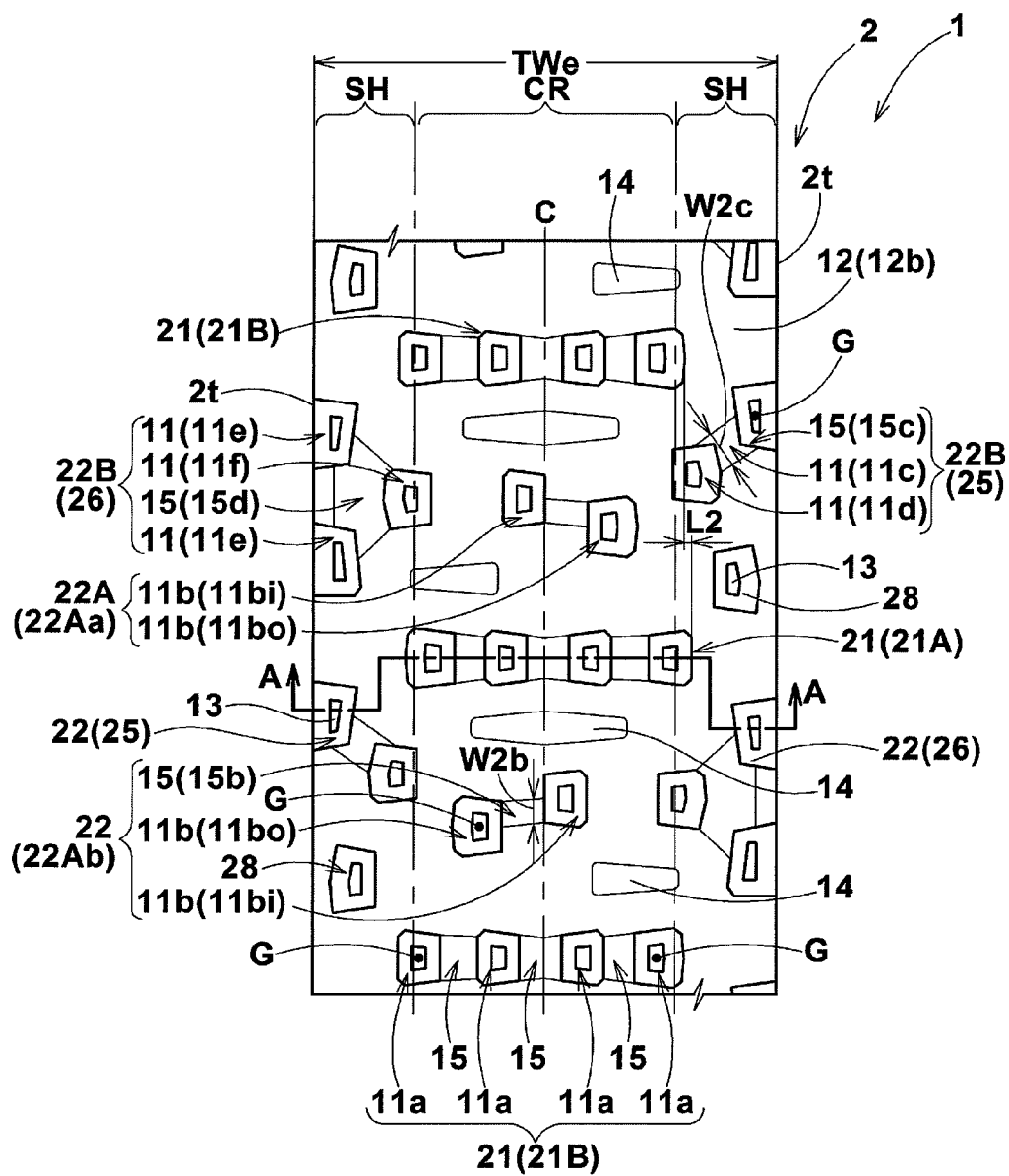
FIG. 2 is a developed partial plan view of the tread portion thereof.

The tread portion 2 is provided with a plurality of blocks 11 arranged sparsely as shown in FIG. 2, and in this embodiment, the land ratio (SL/S) is set in a range of from 10 to 30% in order to increase the digging of the blocks into the soft ground and thereby to produce a large drive power, but not to trap the mud and the like between the blocks.

Incidentally, the land ratio (SL/S) is as well known in the art, a ratio of the ground contacting area SL (or the total area of the top surfaces 11v of the blocks 11) to the gross area of the tread portion 2.

If the land ratio (SL/S) is less than 10%, the drive power on the hard or medium grounds decreases. If the land ratio (SL/S) is more than 30%, the road grip on the soft grounds decreases and thereby the braking performance, the traction performance and the like deteriorate.

As shown in FIG. 1, the bottom 12b of the sea area of the tread portion 2 has a profile which is curved similarly to the profile of the outer surface of the carcass 6.

Here, the sea area means the area surrounding the blocks 11 and corresponding to the grooved area of the tread portion of a tire for passenger cars, truck/bus and the like.

In this embodiment, the depth D1 of the sea bottom 12b from the tread surface is set in a range of from about 6 to 19 mm.

The block 11 protrudes from the sea bottom 12b and has a top surface 11v having a centroid G and defining a part of the tread surface. The block 11 has a sidewall surface 11w extending from the peripheral edge of the top surface 11v toward the sea bottom 12b.

The blocks 11 are grouped into:

a plurality of major groups 21 which are arranged circumferentially of the tire at intervals in the tire circumferential direction; and a plurality of minor groups 22 which are arranged circumferentially of the tire at intervals in the tire circumferential direction so as to alternate with the major groups 21, wherein the major groups 21 each consist of four blocks 11 (center blocks 11a) whose centroids G are within the center region CR of the tread portion 2 and which are arranged axially of the tire and in which every two axially adjacent blocks 11 are connected with a tie bar 15 (tie bar 15a); and the minor groups 22 each consist of two or three blocks 11 which are connected with a tie bar 15.

Here, the center region CR is defined as being centered on the tire equator C and having a developed width of 60% of the developed tread width TWe, and a pair of shoulder regions SH are defined as regions between the center region CR and the tread edges 2t.

The tie bar 15 protrudes radially outwardly from the bottom of the sea area 12. Therefore, the four center blocks 11a of each of the major groups 21 become stiff, and it is possible to remarkably improve the braking performance by their axial edges and the cornering performance by their circumferential edges.

The four center blocks 11a of each major group 21 are arranged substantially in line in order to effectively bring out the above explained advantage of improving the braking performance. More specifically, the angle θ1a of each of straight lines Sa drawn between the axially adjacent centroids G is not more than 10 degrees, preferably not more than 5 degrees, most preferably 0 degrees with respect to the tire axial direction.

The major groups 21 in this embodiment are, as shown in FIG. 2, slightly staggered with respect to the tire equator C, therefore, the major groups 21A shifted rightward and the major groups 21B shifted leftward are alternately arranged in the tire circumferential direction, otherwise all of the major groups 21 have identical structures. In this case, the axial shift L2 between the major group 21A and the major group 21B is preferably set in a range of from 1 to 8% of the developed tread width TWe. By the stagger arrangement, the axial component of the stiff blocks' edges spreads wide in the tire axial direction, which helps to further improve the braking performance.

If the length L2 is less than 1% of the developed tread width TWe, the above-mentioned advantageous effect can not be obtained. If the length L2 exceeds 8% of the developed tread width TWe, it becomes difficult to increase the contact of the blocks with the road surface and thereby improve the traction during straight running.

In each of the major groups 21, two center blocks 11a are disposed on each side of the tire equator C in order to relatively decrease the rigidity of the mass of the tied blocks near the tire equator C so that the mass is bent at the tire equator C and all of the blocks come into contact with the ground and thereby the braking performance can be further improved.

Figure 3:
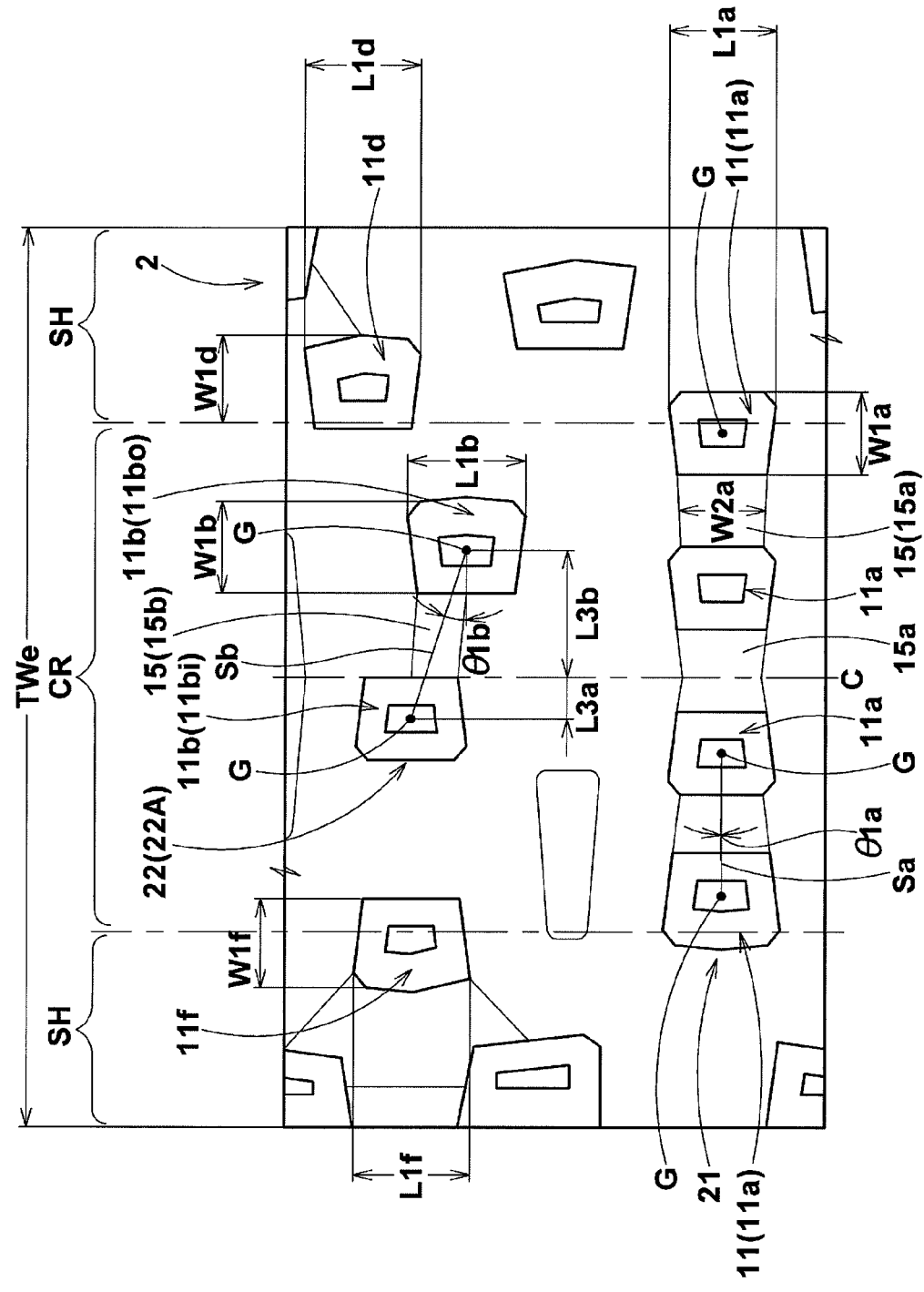
FIG. 3 is a partial plan view showing the major group and minor central group.

In this embodiment, as shown in FIG. 3, the center blocks 11a are each formed in a substantially rectangular shape such that the maximum circumferential length a1a is slightly larger than the maximum axial width W1a.

Preferably, the aspect ratio (L1a/W1a) is about 110 to 140% in order to provide the edges of the top surface with an axial component and a circumferential component well balancedly. In order to increase the lateral stiffness of the center block 11a, it is preferable that the circumferential length of the center block 11a is gradually increased toward the axially outside.

The tie bar 15a extends from the block to block with a radial height H2a of about 10 to 30% of the depth D1 of the sea area 12, and a circumferential width W2a of about 70 to 90% of the maximum circumferential length a1a of the center block 11a. Therefore, the center blocks 11a support each other through the tie bars 15a to increase their stiffness to improve the braking performance.

The minor groups 22 in this embodiment are minor central groups 22A and minor shoulder groups 22B.

The minor central groups 22A in this embodiment are double-block minor central groups each consist of two center blocks 11b whose centroids G are within the center region CR and are disposed one on each side of the tire equator C as shown in FIG. 3. And the two center blocks 11b are connected with the tie bar 15b in order to improve the braking performance. Further, the two center blocks 11b are circumferentially shifted from each other in order to improve the cornering performance.

In order to effectively bring out the above explained advantageous effects, the angle θ1b of a straight line Sb drawn between the centroids G of the two center blocks 11b is preferably set in a range of not less than 15 degrees, more preferably not less than 20 degrees, but not more than 35 degrees, more preferably not more than 30 degrees with respect to the tire axial direction.

If the angle θ1b is less than 15 degrees, it becomes difficult to improve the cornering performance. If the angle θ1b is more than 35 degrees, it becomes difficult to improve the braking performance.

Further, the two center blocks 11b are an inside center block 11bi, the centroid Gb of which is at a smaller axial distance L3a from the tire equator C, and an outside center block 11bo, the centroid Gb of which is at a larger axial distance L3b from the tire equator C which distance is more than the axial distance L3a.

Preferably, the axial distance L3a is about 1 to 4% of the developed tread width TWe, and the axial distance L3b is 5 to 15% of the developed tread width TWe.

As a result, the inside center blocks 11bi show ability to improve the braking performance during straight running, and the outside center blocks 11bo show ability to improve performance during cornering, therefore, the braking performance and cornering performance can be improved in a well balanced manner.

Due to such arrangement, it can be said that the minor central groups 22A are staggered with respect to the tire equator C, therefore the minor central groups 22Aa shifted rightward and the minor central groups 22Ab shifted leftward are alternately arranged in the tire circumferential direction.

In this embodiment, as shown in FIG. 3, the inside center block 11bi and the outside center block 11bo are each formed in a rectangular shape similar to the center block 11a of the major group 21, and the maximum circumferential length L1b is slightly larger than the maximum axial width W1b.

Preferably, the aspect ratio (L1b/W1b) is about 110 to 140% in order to provide the edges of the top surface with an axial component and a circumferential component well balancedly. In this embodiment, as shown in FIG. 2, the circumferential width W2b of the tie bar 15b connecting between the inside center block 11bi and the outside center block 11bo is smaller than that of the tie bar 15a in the major group 21 in order that the mass of the tied blocks 11bi can be bent in some degree to effectively improve the braking performance and cornering performance and to enhance self ejection of mud entered between the blocks 11$bi$.

For that propose, it is preferable that the radial height of the tie bar 15$b$ is about 10 to 30% of the depth D1 of the sea area 12, and the circumferential width W2$b$ of the tie bar 15$b$ is about 30 to 50% of the maximum circumferential length L1$b$ of the center block 11$b$.

The above-mentioned minor shoulder groups 22B each consist of blocks 11 whose centroid G is within one of the shoulder regions SH.

In this embodiment, the minor shoulder groups 22B are
double-block minor shoulder groups 25 consisting of two blocks 11 and
triple-block minor shoulder groups 26 consisting of three blocks 11.
with respect to the tire equator C,
the double-block minor shoulder groups 25 are staggered and also the triple-block minor shoulder groups 26 are staggered. As a result, on each side of the tire equator C, the double-block minor shoulder groups 25 and the triple-block minor shoulder groups 26 are alternately arranged in the circumferential direction.

The double-block minor shoulder group 25 consists of a shoulder block 11$c$ disposed at the tread edge and a middle block 11$d$ disposed axially inside the shoulder block 11$c$. The shoulder block 11$c$ and the middle block 11$d$ are connected with the tie bar 15$c$.

Figure 4:
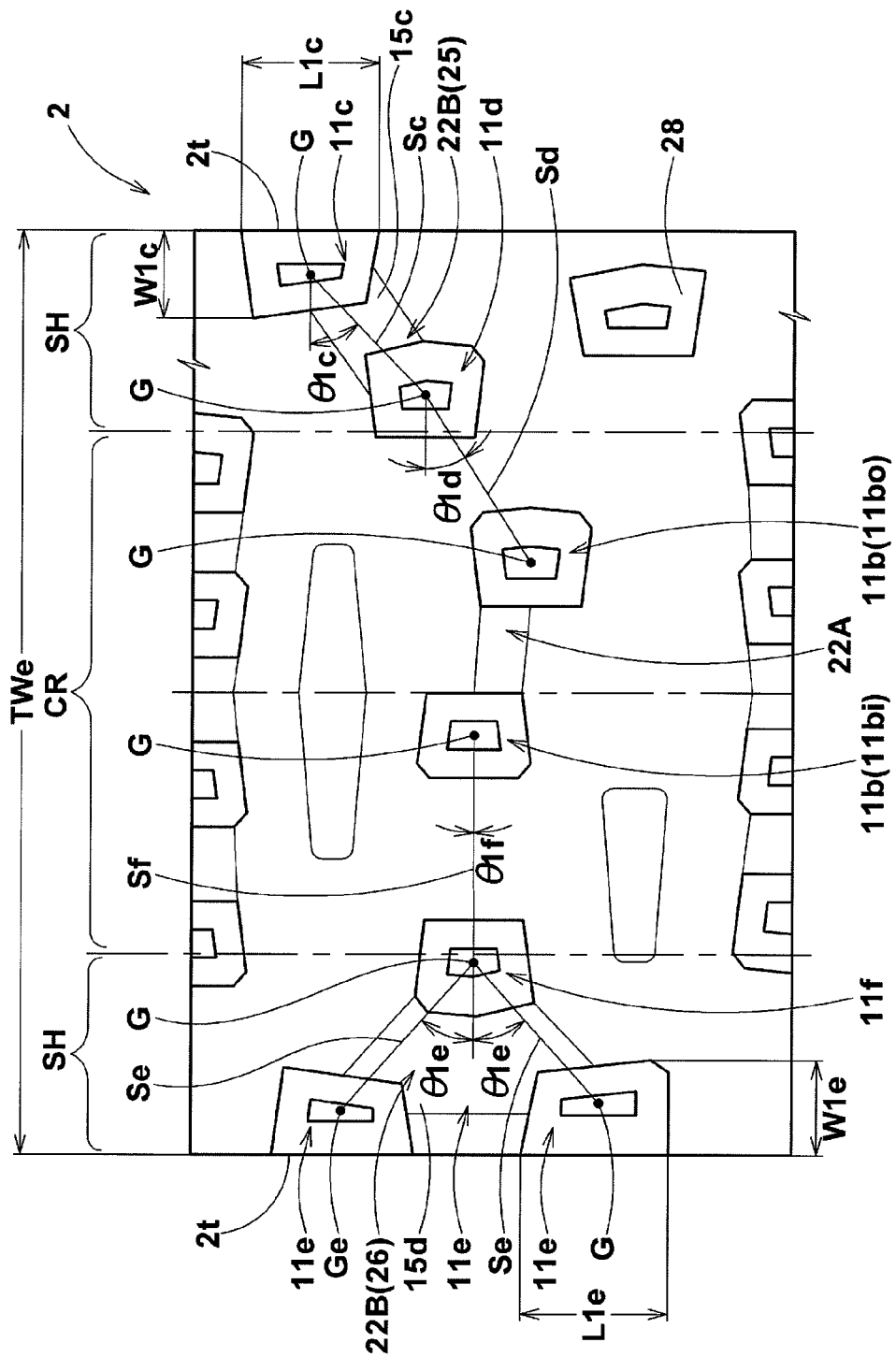
FIG. 4 is a partial plan view showing the minor shoulder group.

In this example, as shown in FIG. 4, the shoulder block 11$c$ is formed in a substantially rectangular shape in which the maximum circumferential length L1$c$ is more than the maximum axial width W1$c$.

Preferably, the aspect ratio (L1$c$/W1$c$) is about 150 to 170% in order to improve the cornering performance.

Further, in order to increase the lateral stiffness of the shoulder block 11$c$, it is preferable that the circumferential length of the shoulder block 11$c$ is gradually increased toward the axially outside.

As shown in FIG. 3, the middle block 11$d$ is formed in a substantially rectangular shape and in this example, the maximum circumferential length L1$d$ is slightly larger than the maximum axial width W1$d$.

Preferably, the aspect ratio (L1$d$/W1$d$) is about 110 to 140% in order to improve the cornering performance and traction performance in a well balanced manner.

Further, in order to increase the lateral stiffness of the middle block 11$d$, it is preferable that the circumferential length of the middle block 11$d$ is gradually increased toward the axially outside.

In this embodiment, as shown in FIG. 4, the middle block 11$d$ is circumferentially shifted from the shoulder block 11$c$ so that the effective circumferential component of the edges of the shoulder block 11$c$ and the middle block 11$d$ is increased, and thereby the cornering performance can be improved.

In order to effectively derive the above explained advantageous effect, the angle θ1$c$ of a straight line Sc drawn between the centroids G of the shoulder block 11$c$ and the middle block 11$d$ is preferably set in a range of not less than 30 degrees, more preferably not less than 35 degrees, but not more than 50 degrees, more preferably not more than 45 degrees with respect to the tire axial direction.

If the angle θ1$c$ is less than 30 degrees, it becomes difficult to improve the cornering performance. If the angle θ1$c$ exceeds 50 degrees, it becomes difficult to improve the braking performance.

It is preferable that the middle block 11$d$ of the double-block minor shoulder group 25 is arranged axially adjacently to and circumferentially shifted from the outside center block 11$bo$ of one of the minor central groups 22A, and the angle θ1$d$ of a straight line Sd drawn between the centroids G of the middle block 11$d$ and the outside center block 11$bo$ is set in a range of not less than 25 degrees, more preferably not less than 30 degrees, but not more than 45 degrees, more preferably not more than 40 degrees with respect to the tire axial direction in order to improve the cornering performance. If the angle θ1$d$ is less than 25 degrees or the angle θ1$d$ exceeds 45 degrees, it becomes difficult to improve the cornering performance.

Preferably, the radial height of the tie bar 15$c$ is about 10 to 30% of the depth D1 of the sea area 12 and
the circumferential width W2$c$ thereof is about 45 to 65% of the maximum circumferential length L1$c$ of the shoulder block 11$c$ in order to increase the stiffness of the double-block minor shoulder group 25 and thereby improve the cornering performance.

The triple-block minor shoulder group 26 consists of two circumferentially adjacent shoulder blocks 11$e$ disposed at the tread edge and one middle block 11$f$ disposed axially inside the two shoulder blocks 11$e$, and the tree blocks 11$e$ are connected with a single tie bar 15$d$.

The two shoulder blocks 11$e$ are each formed in a rectangular shape similar to the shoulder block 11$c$ in the double-block minor shoulder group 25 and the maximum circumferential length file is more than the maximum axial width w/e.

Preferably, the aspect ratio (L1$e$/W1$e$) is about 150 to 170% in order to improve the cornering performance and traction performance well balancedly.

As shown in FIG. 3, the middle block 11$f$ is formed in a substantially rectangle, and the maximum circumferential length L1$f$ is slightly larger than the maximum axial width W1$f$. Preferably, the aspect ratio (L1$f$/W1$f$) is about 110 to 140% in order to improve the cornering performance and the traction performance during cornering well balancedly.

As shown in FIG. 4, the middle block 11$f$ is disposed between the two shoulder blocks 11$e$.

The angle θ1$e$ of a straight line Se drawn from the centroid G of the middle block 11$f$ to the centroid G of each shoulder block 11$e$ is preferably set in a range of not less than 30 degrees, more preferably not less than 35 degrees, but not more than 50 degrees, more preferably not more than 45 degrees with respect to the tire axial direction.

Therefore, in cooperation with the two shoulder blocks 11$e$, the middle block 11$f$ can improve the cornering performance. If the angle θ1$e$ is less than 30 degrees or the angle θ1$e$ exceeds 50 degrees, it becomes difficult to improve the cornering performance.

It is preferable that, in the tire axial direction, the middle block 11$f$ of the triple-block minor shoulder group 26 is arranged in line with the inside center block 11$bi$ of one of the minor central groups 22A, and
the angle θ1$f$ of a straight line Sf drawn between the centroids G of the middle block 11$f$ and the inside center block 11$bi$ is not more than 10 degrees, more preferably not more than 5 degrees, most preferably 0 degrees with respect to the tire axial direction in order to improve the braking performance.

In the case of the triple-block minor shoulder group 26, the tie bar 15$d$ is, in its plan view, formed in a substantially triangular shape to connect two shoulder blocks 11$e$ and one middle block 11$f$ by one tie bar 15$d$.

Preferably, the radial height of the tie bar 15$d$ is about 10 to 30% of the depth D1 of the sea area 12 in order to increase the stiffness of the triple-block minor shoulder group 26 and thereby improve the cornering performance and traction performance.

In this embodiment, as shown in FIG. 2, the blocks 11 further include solo blocks 28 in addition to the above-mentioned various groups of the tied blocks.

For example, on each side of the tire equator, the solo blocks 28 are each disposed between a combination of circumferentially adjacent one double-block minor shoulder group 25 and one triple-block minor shoulder group 26, and the next combination so as to come close to the inside center blocks 11bi of one of the minor central groups 22A in order to improve the cornering performance.

In this embodiment, as shown in FIG. 1 and FIG. 2, the top surface 11v of each block 11 is provided with an independent indentation 13 so as to include the centroid G therein. In the plan view of the block 11, the area of the indentation 13 is preferably set in a range of about 8 to 18% of the gross area of the top surface, and the depth D2 of the indentation 13 is preferably set in a range of about 1 to 3 mm in order to increase the edges and the suppleness of the block 11 and thereby improve the road grip performance.

In this embodiment, in order to increase the contact of the blocks 11 with the road surface, the sea bottom 12b is provided with grooves 14 to enable the tread portion 2 to be deformed locally when coming into contact with the road surface. In this embodiment, as shown in FIG. 2, the grooves 14 are disposed near the quad-block major groups 21 and the triple-block minor groups 26 so as to prolong the ground contacting time of each of the major groups and the relatively large triple-block groups, in other words, to enable the tied blocks in each group to be contact with the ground together for a long time as far as possible. In FIG. 2, the groove 14 having a relatively larger axial dimension and centered on the tire equator is disposed adjacently to each of the main groups on one side thereof in the tire circumferential direction, and the groove 14 having a relatively smaller axial dimension is disposed off-center and adjacently to the main group on the other side thereof in the tire circumferential direction.

In this embodiment, the sizes of the blocks 11 whose centroids are disposed in the shoulder regions SH are formed slightly larger than the sizes of the blocks 11 whose centroids are disposed in the center region CR, but the variation of the size is limited under 50%. More specifically, the top surface's gross area TAmax of the largest block and the top surface's gross area TAmin of the smallest block are: (TAmax−Tamin)/Tamin<0.5

Further, each of the major groups 21 as an assemblage of the four blocks and tie bars 15a extends across the entire width of the center region CR, and
each of the triple-block minor groups 26 as an assemblage of the three blocks and single triangular tie bar 15d extends across the entire width of the shoulder region SH.

The solo blocks 28 are disposed in only the shoulder regions SH. The center region CR is not provided with a solo block but the tied blocks.

Figure 5A:
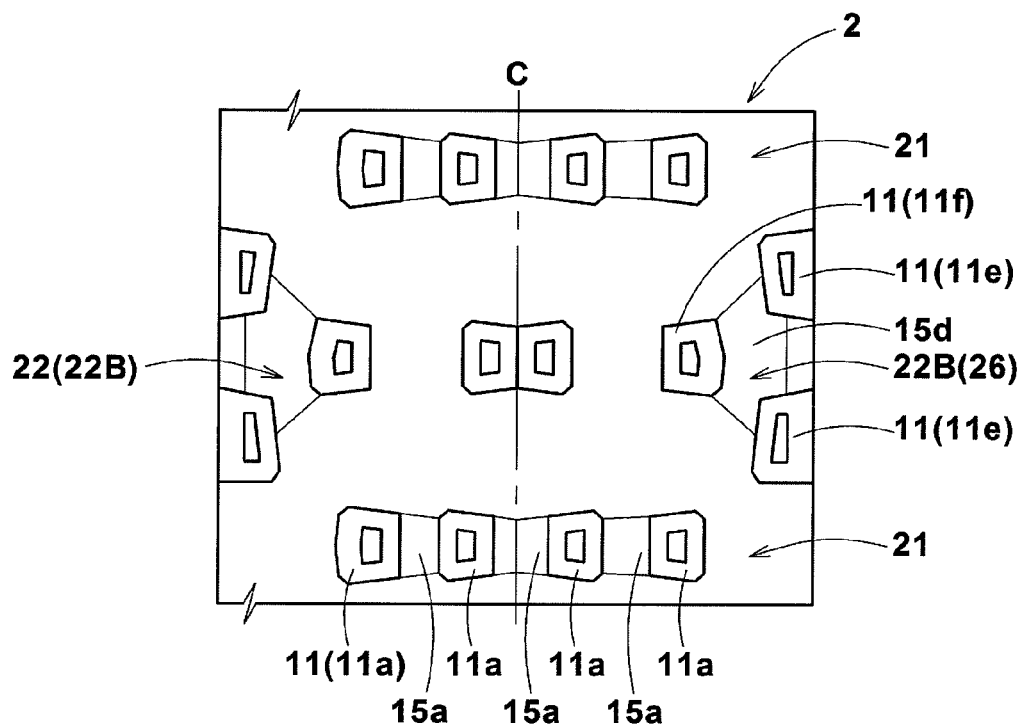
FIG. 5(a) is a developed partial plan view of the tread portion of a motorcycle tire according to the present invention.
Figure 5B:
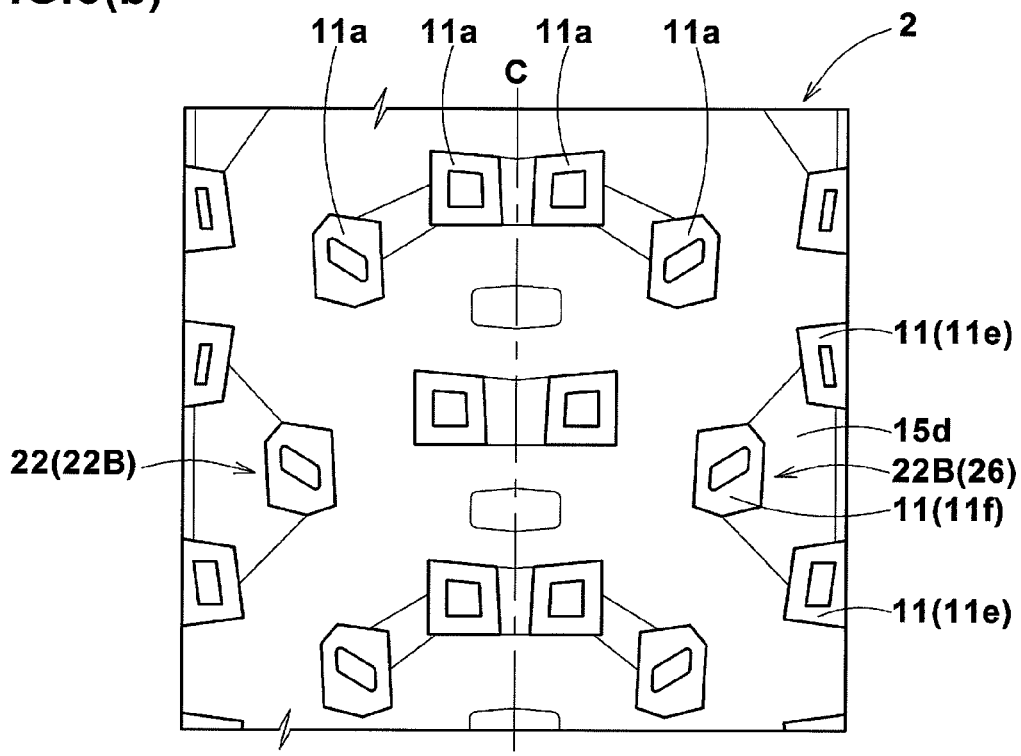
FIG. 5(b) is a developed partial plan view of the tread portion of a comparative example tire used in the undermentioned comparison test.

FIG. 5(a) show another embodiment of the present invention. In this embodiment, the blocks 11 include the major groups 21 arranged in the same way as the former embodiment. Between every two of the major groups 21, two triple-block minor shoulder groups 26 are respectively disposed at the tread edges and further, one independent block is disposed on the tire equator. The two triple-block minor shoulder groups 26 and the one independent block are disposed at the substantially same circumferential position which is the midpoint between the two adjacent major groups 21. The independent block has such a shape that the above-mentioned two center blocks 11b of the minor central group 22A are directly connected with each other into one.

Comparison Tests

Test tires having the internal structure shown in FIG. 1 and blocks whose specifications are shown in Table 1 were experimentally manufactured and tested.

In the test, 450 cc motorcycle provided on the front and rear wheels with test tires (tire pressure: front=rear=80 kPa) was run on a rough terrain for tire testing, and the test rider evaluated the contact of the blocks with the road surface, braking performance and cornering performance (cornering grip, slide controllability).

The test results are shown in Table 1 by an index based on Embodiment tire Ex.1 being 100, wherein the larger the index number, the better the performance.

common specifications are as follows.

tire size:
    front: 90/100-21 (rim size: 1.60 × 21)
    rear: 120/80-19 (rim size: 2.15 × 19)
axial tread width TW: 145 mm
developed tread width TWe: 175 mm
depth D1: 11.5 mm
land ratio: 20%
indentation:
    area: 13% of gross top surface area
    depth D2: 2 mm
major group:
    center block
        maximum length L1a: 15 mm
        maximum width W1a: 12 mm (L1a/W1a = 125%)
    tie bar
        height H2a: 2.5 mm (H2a/D1 = 21.7%)
        width W2a: 12 mm (W2a/L1a = 80%)
minor central group:
    center block
        maximum length L1b: 15 mm
        maximum width W1b: 12 mm (L1b/W1b = 125%)
    inside center block
        distance L3a: 6 mm (L3a/TWe = 3.4%)
    outside center block
        distance L3b: 18 mm (L3b/TWe = 10.3%)
    tie bar
        width W2b: 6 mm (W2b/L1b = 40%)
double-block minor shoulder group:
    shoulder block
        maximum length L1c: 18 mm,
        maximum width W1c: 11 mm (L1c/W1c = 163.6%)
    middle block
        maximum length L1d: 16 mm
        maximum width W1d: 13 mm (L1d/W1d = 123.1%)
    tie bar
        width W2c: 10 mm (W2c/L1c = 55.6%)
triple-block minor shoulder group:
    shoulder block
        maximum length L1e: 20 mm
        maximum width W1e: 12 mm (L1e/W1e = 166.7%)
    middle block
        maximum length L1f: 16 mm
        maximum width W1f: 13 mm (L1f/W1f = 123.1%)

From the test results, it was confirmed that, according to the invention, the cornering performance and braking performance can be improved effectively.

TABLE 1

| tire | Ex. 1 | Ref. 1 | Ex. 2 | Ex. 3 | Ex. 4 | Ref. 2 |
|---|---|---|---|---|---|---|
| tread patter (Fig. No.) | 5(a) | 5(b) | 1 | 1 | 1 | — |
| major group exist ? | yes | non | yes | yes | yes | yes |
| minor group exist ? | yes | yes | yes | yes | yes | no |
| angle θ1a (deg.) | 0 | — | 0 | 0 | 0 | 0 |
| angle θ1b (deg.) | — | 0 | 20 | 20 | 20 | — |
| angle θ1c (deg.) | 40 | 40 | 40 | 40 | 40 | — |
| angle θ1d (deg.) | — | — | 35 | 35 | 35 | — |
| angle θ1e (deg.) | 40 | 40 | 40 | 40 | 40 | — |

TABLE 1-continued

| tire | Ex. 1 | Ex. 2 | Ref. 1 | Ref. 2 | Ex. 3 | Ex. 4 |
|---|---|---|---|---|---|---|
| angle θ1f (deg.) | — | — | 0 | 0 | 0 | — |
| indentation exist ? | yes | yes | no | yes | yes | yes |
| axial shift L2 (mm) | 0.0 | — | 0.0 | 0.0 | 2.6 | 2.6 |
| L2/TWe (%) | 0.0 | — | 0.0 | 0.0 | 1.5 | 1.5 |
| contact with road surface | 100 | 90 | 95 | 100 | 100 | 100 |
| braking performance | 100 | 90 | 95 | 95 | 100 | 100 |
| cornering performance | 100 | 115 | 110 | 110 | 115 | 90 |

| tire | Ex. 5 | Ex. 6 | Ex. 7 | Ex. 8 | Ex. 9 | Ex. 10 |
|---|---|---|---|---|---|---|
| tread patter (Fig. No.) | 1 | 1 | 1 | 1 | 1 | 1 |
| major group exist ? | yes | yes | yes | yes | yes | yes |
| minor group exist ? | yes | yes | yes | yes | yes | yes |
| angle θ1a (deg.) | 0 | 0 | 0 | 0 | 0 | 10 |
| angle θ1b (deg.) | 20 | 20 | 20 | 20 | 20 | 20 |
| angle θ1c (deg.) | 40 | 40 | 20 | 60 | 40 | 40 |
| angle θ1d (deg.) | 20 | 50 | 35 | 35 | 35 | 35 |
| angle θ1e (deg.) | 40 | 40 | 20 | 60 | 40 | 40 |
| angle θ1f (deg.) | 0 | 0 | 0 | 0 | 20 | 0 |
| indentation exist ? | yes | yes | yes | yes | yes | yes |
| axial shift L2 (mm) | 2.6 | 2.6 | 2.6 | 2.6 | 2.6 | 2.6 |
| L2/TWe (%) | 1.5 | 1.5 | 1.5 | 1.5 | 1.5 | 1.5 |
| contact with road surface | 100 | 100 | 100 | 105 | 95 | 100 |
| braking performance | 105 | 95 | 100 | 95 | 95 | 95 |
| cornering performance | 95 | 110 | 95 | 95 | 105 | 115 |

| tire | Ex. 11 | Ex. 12 | Ex. 13 | Ref. 3 | Ex. 14 |
|---|---|---|---|---|---|
| tread patter (Fig. No.) | 1 | 1 | 1 | 1 | 1 |
| major group exist ? | yes | yes | yes | yes | yes |
| minor group exist ? | yes | yes | yes | yes | yes |
| angle θ1a (deg.) | 0 | 0 | 0 | 20 | 0 |
| angle θ1b (deg.) | 15 | 35 | 20 | 20 | 80 |
| angle θ1c (deg.) | 40 | 40 | 40 | 40 | 40 |
| angle θ1d (deg.) | 35 | 35 | 35 | 35 | 35 |
| angle θ1e (deg.) | 40 | 40 | 40 | 40 | 40 |
| angle θ1f (deg.) | 0 | 0 | 0 | 0 | 0 |
| indentation exist ? | yes | yes | yes | yes | yes |
| axial shift L2 (mm) | 2.6 | 2.6 | 13.9 | 2.6 | 2.6 |
| L2/TWe (%) | 1.5 | 1.5 | 8 | 1.5 | 1.5 |
| contact with road surface | 100 | 100 | 95 | 100 | 100 |
| braking performance | 100 | 95 | 100 | 90 | 93 |
| cornering performance | 105 | 115 | 110 | 110 | 100 |

The invention claimed is:

1. A motorcycle tire for running on rough terrain comprising:
a tread portion provided with a block pattern defined by blocks, the blocks including major groups arranged circumferentially of the tire at intervals and minor groups between the major groups, wherein
each of the major groups consists of four of said blocks arranged axially with respect to the tire and each is connected to the next with a tie bar having a radial height lower than that of the blocks, wherein the four blocks are each defined as having the centroid of its top surface within a center region of the tread portion defined as being centered on the tire equator and having a developed width of 60% of a developed tread width, and angles (θ1a) of straight lines drawn between the axially adjacent centroids are not more than 10 degrees with respect to the tire axial direction, and
each of the minor groups consists of two or three of said blocks connected with each other with a tie bar having a radial height lower than that of the blocks, and angles of straight lines drawn between axially adjacent centroids of the top surfaces of the blocks of the minor groups are 15 to 80 degrees with respect to the tire axial direction, and
wherein the minor groups include
minor central groups whose blocks each have the centroid of its top surface within the center region of the tread portion, and
minor shoulder groups whose blocks each have the centroid of its top surface within a shoulder region of the tread portion outside the center region.

2. The motorcycle tire for running on rough terrain according to claim 1, wherein the minor central group consists of two of said blocks whose centroids are disposed one on each side of the tire equator and shifted from each other in the tire circumferential direction.

3. The motorcycle tire for running on rough terrain according to claim 2, wherein the two blocks of the minor central group are
an inside center block having a centroid that is positioned at an axial distance L3a from the tire equator, and
an outside center block having a centroid that is positioned at an axial distance L3b from the tire equator which is more than the axial distance L3a.

4. The motorcycle tire for running on rough terrain according to claim 3, wherein the minor shoulder groups include
double-block minor shoulder groups, each consisting of two of said blocks, and arranged in a staggered manner on both sides of the tire equator, and
triple-block minor shoulder groups, each consisting of three of said blocks, and arranged in a staggered manner on both sides of the tire equator.

5. The motorcycle tire for running on rough terrain according to claim 4, wherein
an angle (θ1c) of a straight line drawn between the centroids of the two blocks of the double-block minor shoulder group is 30 to 50 degrees with respect to the tire axial direction, and
the two blocks of the double-block minor shoulder group are a shoulder block disposed at the tread edge and a middle block disposed axially inside the shoulder block.

6. The motorcycle tire for running on rough terrain according to claim 5, wherein an angle (θ1d) of a straight line drawn between the centroid of the middle block and the axially adjacent centroid of the outside center block of one of the minor central groups is 25 to 45 degrees with respect to the tire axial direction.

7. The motorcycle tire for running on rough terrain according to claim 4, wherein
the three blocks of the triple-block minor shoulder group are two shoulder blocks disposed at the tread edge and one middle block disposed at a position axially inside the two shoulder blocks and circumferentially between the two shoulder blocks, and
angles (θ1e) of straight lines drawn between the centroid of the middle block and the two centroids of the two shoulder blocks are 30 to 50 degrees with respect to the tire axial direction.

8. The motorcycle tire for running on rough terrain according to claim 7, wherein an angle (θ1f) of a straight line drawn between the centroid of the middle block of the triple-block minor shoulder group and the axially adjacent centroid of the inside center block of one of the minor central groups is not more than 10 degrees with respect to the tire axial direction.

9. The motorcycle tire for running on rough terrain according to claim 2, wherein the minor shoulder groups include
double-block minor shoulder groups, each consisting of two of said blocks, and arranged in a staggered manner on both sides of the tire equator, and
triple-block minor shoulder groups, each consisting of three of said blocks, and arranged in a staggered manner on both sides of the tire equator.

10. The motorcycle tire for running on rough terrain according to claim 9, wherein an angle ($\theta 1c$) of a straight line drawn between the centroids of the two blocks of the double-block minor shoulder group is 30 to 50 degrees with respect to the tire axial direction, and the two blocks of the double-block minor shoulder group are a shoulder block disposed at the tread edge and a middle block disposed axially inside the shoulder block.

11. The motorcycle tire for running on rough terrain according to claim 10, wherein an angle ($\theta 1d$) of a straight line drawn between the centroid of the middle block and the axially adjacent centroid of the outside center block of one of the minor central groups is 25 to 45 degrees with respect to the tire axial direction.

12. The motorcycle tire for running on rough terrain according to claim 9, wherein the three blocks of the triple-block minor shoulder group are two shoulder blocks disposed at the tread edge and one middle block disposed at a position axially inside the two shoulder blocks and circumferentially between the two shoulder blocks, and angles ($\theta 1e$) of straight lines drawn between the centroid of the middle block and the two centroids of the two shoulder blocks are 30 to 50 degrees with respect to the tire axial direction.

13. The motorcycle tire for running on rough terrain according to claim 12, wherein an angle ($\theta 1f$) of a straight line drawn between the centroid of the middle block of the triple-block minor shoulder group and the axially adjacent centroid of the inside center block of one of the minor central groups is not more than 10 degrees with respect to the tire axial direction.

14. The motorcycle tire for running on rough terrain according to claim 1, wherein the top surfaces of the blocks are each provided with an independent indentation.

15. The motorcycle tire for running on rough terrain according to claim 1, wherein the major groups are staggered with respect to the tire equator so that the axial shift between the groups shifted rightward and the groups shifted leftward is 1 to 8% of the developed tread width.

* * * * *